US012198634B2

(12) United States Patent
Chen et al.

(10) Patent No.: US 12,198,634 B2
(45) Date of Patent: Jan. 14, 2025

(54) PIXEL CIRCUIT, DRIVING METHOD, DISPLAY SUBSTRATE AND DISPLAY DEVICE

(71) Applicants: CHONGQING BOE DISPLAY TECHNOLOGY CO., LTD., Chongqing (CN); BOE TECHNOLOGY GROUP CO., LTD., Beijing (CN)

(72) Inventors: Teng Chen, Beijing (CN); Dawei Shi, Beijing (CN); Wentao Wang, Beijing (CN); Tianlong Zhao, Beijing (CN); Liang Zhou, Beijing (CN); Shuaizhuo Liu, Beijing (CN); Chuanyong Li, Beijing (CN)

(73) Assignees: CHONGQING BOE DISPLAY TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/801,513

(22) PCT Filed: Sep. 29, 2021

(86) PCT No.: PCT/CN2021/121743

§ 371 (c)(1),
(2) Date: Aug. 22, 2022

(87) PCT Pub. No.: WO2023/050165

PCT Pub. Date: Apr. 6, 2023

(65) Prior Publication Data

US 2024/0194142 A1 Jun. 13, 2024

(51) Int. Cl.
*G09G 3/3258* (2016.01)
*G09G 3/3225* (2016.01)
(Continued)

(52) U.S. Cl.
CPC ......... *G09G 3/3258* (2013.01); *G09G 3/3225* (2013.01); *G09G 3/3233* (2013.01);
(Continued)

(58) Field of Classification Search
CPC .. G09G 3/3258; G09G 3/3266; G09G 3/3291; G09G 2300/0426;
(Continued)

(56) References Cited

U.S. PATENT DOCUMENTS

2004/0263057 A1 12/2004 Uchino et al.
2008/0169460 A1 7/2008 Yoo
(Continued)

FOREIGN PATENT DOCUMENTS

CN 1577458 A 2/2005
CN 105096819 A 11/2015
(Continued)

*Primary Examiner* — Jason M Mandeville
(74) *Attorney, Agent, or Firm* — BROOKS KUSHMAN P.C.

(57) ABSTRACT

The present disclosure provides a display substrate and a display device. The display substrate includes a driving circuit, a light-emitting element, a first light-emitting control circuit, a first control circuit, a second control circuit, a third control circuit, a data writing-in circuit and an energy storage circuit. The first control circuit is configured to control to connect the first voltage line and a first end of the light-emitting element under the control of the first control signal; the second control circuit is configured to control to connect the reference voltage line and the second end of the light-emitting element under the control of a second control signal; the third control circuit is configured to control to connect the first end of the energy storage circuit and the control end of the driving circuit under the control of a third control signal.

14 Claims, 9 Drawing Sheets

(51) Int. Cl.

| | |
|---|---|
| ***G09G 3/3233*** | (2016.01) |
| ***G09G 3/3266*** | (2016.01) |
| ***G09G 3/3291*** | (2016.01) |

(52) U.S. Cl.

CPC ......... *G09G 3/3266* (2013.01); *G09G 3/3291* (2013.01); *G09G 2300/0426* (2013.01); *G09G 2300/0842* (2013.01); *G09G 2310/061* (2013.01); *G09G 2310/08* (2013.01); *G09G 2320/043* (2013.01); *G09G 2330/021* (2013.01)

(58) Field of Classification Search

CPC ..... G09G 2300/0842; G09G 2310/061; G09G 2310/08; G09G 2320/043; G09G 2330/021

USPC .................................................... 345/76, 204

See application file for complete search history.

(56) References Cited

U.S. PATENT DOCUMENTS

| | | | | |
|---|---|---|---|---|
| 2017/0162119 | A1* | 6/2017 | Kim | G09G 3/3258 |
| 2018/0033365 | A1 | 2/2018 | Zhang et al. | |
| 2018/0181242 | A1* | 6/2018 | Mizuhashi | G06F 3/0446 |
| 2018/0226020 | A1 | 8/2018 | Wang et al. | |
| 2020/0202797 | A1* | 6/2020 | Cho | G09G 3/035 |
| 2021/0390300 | A1* | 12/2021 | Utsumi | G06Q 20/18 |

FOREIGN PATENT DOCUMENTS

| | | | |
|---|---|---|---|
| CN | 106205491 | A | 12/2016 |
| CN | 109686313 | A | 4/2019 |
| CN | 109728068 | A | 5/2019 |
| CN | 210627878 | U | 5/2020 |
| CN | 111768739 | A | 10/2020 |
| EP | 2306444 | A1 | 4/2011 |
| JP | 2003280582 | A | 10/2003 |
| JP | 2005140827 | A | 6/2005 |
| KR | 20080054764 | A | 6/2008 |

* cited by examiner

PIXEL CIRCUIT, DRIVING METHOD, DISPLAY SUBSTRATE AND DISPLAY DEVICE

CROSS-REFERENCE TO RELATED APPLICATIONS

This application is the U.S. national phase of PCT Application No. PCT/CN2021/121743 filed on Sep. 29, 2021, which is incorporated herein by reference in its entirety.

TECHNICAL FIELD

The present disclosure relates to the field of display technology, in particular to a pixel circuit, a driving method, a display substrate and a display device.

BACKGROUND

The biggest disadvantage of Organic Light Emitting Diode (OLED) display products is a short service life. Before the light-emitting phase, a certain negative voltage is intermittently applied to the anode of the OLED, which can eliminate the positive charge inside the OLED material to prolong the life of the light-emitting material. The driving method is abbreviated as PCV driving.

In medium-sized products such as car computers and notebooks, the voltage value of the low-voltage signal connected to the cathode of the OLED is −5V, and the anode of the OLED needs to be supplied with a voltage of −7V to −9V, and the p-type transistor outputs a voltage of −9V under the condition of a gate voltage of −11V (in the case that the threshold voltage of the p-type transistor is −2V), this solution will increase the power consumption for the Gate On Array (GOA) circuit (that is the gate driving circuit arranged on an array substrate), and increase the delay time when transmitting the signals. In addition, too high negative voltage will reduce the reliability of Bias Temperature Stability (BST) of the TFT.

SUMMARY

In one aspect, the present disclosure provides in some embodiments a pixel circuit includes a driving circuit, a light-emitting element, a first light-emitting control circuit, a first control circuit, a second control circuit, a third control circuit, a data writing-in circuit and an energy storage circuit; the first control circuit is electrically connected to a first control line, a first voltage line and a second end of the driving circuit, respectively, and is configured to control to connect the first voltage line and a first end of the light-emitting element under the control of the first control signal provided by the first control line; the first light-emitting control circuit is respectively electrically connected to a first light-emitting control line, a second end of the light-emitting element and a first voltage line, and is configured to control to connect the second end of the light-emitting element and the first voltage line under the control of a first light-emitting control signal provided by the first light-emitting control line; the second control circuit is electrically connected to a second control line, a reference voltage line and the second end of the light-emitting element, respectively, is configured to control to connect the reference voltage line and the second end of the light-emitting element under the control of a second control signal provided by the second control line; the third control circuit is electrically connected to a third control line, a first end of the energy storage circuit and a control end of the driving circuit, respectively, and is configured to control to connect the first end of the energy storage circuit and the control end of the driving circuit under the control of a third control signal provided by the third control line; the data writing-in circuit is electrically connected to a scan line, a data line and the first end of the energy storage circuit, respectively, and is configured to control to write the data voltage on the data line into the first end of the energy storage circuit under the control of a scan signal provided by the scan line; the second end of the energy storage circuit is electrically connected to the first end of the driving circuit, and the energy storage circuit is used for storing electrical energy; the second end of the driving circuit is electrically connected to the first end of the light-emitting element; the driving circuit is configured to control to connect the first end of the driving circuit and the second end of the driving circuit under the control of a potential of the control end of the driving circuit.

In an embodiment of the present disclosure, the pixel circuit further includes a second light-emitting control circuit and an initial control circuit; the second light-emitting control circuit is respectively electrically connected to the second light-emitting control line, the second voltage line and the first end of the driving circuit, and is configured to control to connect the first end of the driving circuit and the second voltage line under the control of a second light-emitting control signal provided by the second light-emitting control line; the initial control circuit is respectively electrically connected to the initial control line, and the control end of the driving circuit and the reference voltage line, is configured to connect the reference voltage line and the control end of the driving circuit under the control of the initial control signal provided by the initial control line.

In an embodiment of the present disclosure, the transistors included in the pixel circuit are all p-type transistors, and the third control line and the first light-emitting control line are the same signal line; the first control line, the second control line, the scan line, and the initial control line are the same signal line.

In an embodiment of the present disclosure, transistors included in the first light-emitting control circuit and transistors included in the second light-emitting control circuit are p-type transistors; transistors included in the third control circuit are p-type transistors, and transistors included in the second control circuit are n-type transistors; the first light-emitting control line, the second light-emitting control line, the second control line and the third control line are the same signal line; transistors included in the data writing-in circuit are n-type transistors, the transistors included in the initial control circuit are n-type transistors, and the scan line and the initial control line are the same signal line.

In an embodiment of the present disclosure, the first control circuit includes a first transistor, the second control circuit includes a second transistor, and the first light-emitting control circuit includes a third transistor; a control electrode of the first transistor is electrically connected to the first control line, a first electrode of the first transistor is electrically connected to the first voltage line, and a second electrode of the first transistor is electrically connected to the second end of the driving circuit; a control electrode of the second transistor is electrically connected to the second control line, a first electrode of the second transistor is electrically connected to the reference voltage line, and a second electrode of the second transistor is electrically connected to the second end of the light-emitting element; a control electrode of the third transistor is electrically connected to the first light-emitting control line, a first electrode of the third transistor is electrically connected to the first voltage line, and a second electrode of the third transistor is electrically connected to the second end of the light-emitting element.

In an embodiment of the present disclosure, the third control circuit includes a fourth transistor, the data writing-in circuit includes a fifth transistor, and the energy storage circuit includes a storage capacitor; a control electrode of the fourth transistor is electrically connected to the third control line, a first electrode of the fourth transistor is electrically connected to a first end of the storage capacitor, and a second electrode of the fourth transistor is electrically connected to the control end of the driving circuit; a control electrode of the fifth transistor is electrically connected to the scan line, a first electrode of the fifth transistor is electrically connected to the data line, and a second electrode of the fifth transistor is electrically connected to the first end of the storage capacitor; a second end of the storage capacitor is electrically connected to the first end of the driving circuit.

In an embodiment of the present disclosure, the second light-emitting control circuit includes a sixth transistor, and the initial control circuit includes a seventh transistor; a control electrode of the sixth transistor is electrically connected to the second light-emitting control line, a first electrode of the sixth transistor is electrically connected to the second voltage line, and a second electrode of the sixth transistor is electrically connected to the first electrode of the driving transistor; a control electrode of the seventh transistor is electrically connected to the initial control line, a first electrode of the seventh transistor is electrically connected to the reference voltage line, and a second electrode of the seventh transistor is electrically connected to the control end of the driving circuit.

In an embodiment of the present disclosure, the driving circuit comprises a driving transistor; a control electrode of the driving transistor is the control end of the driving circuit, a first electrode of the driving transistor is the first end of the driving circuit, and a second electrode of the driving circuit is the second end of the driving circuit.

In a second aspect, an embodiment of the present disclosure provides a driving method, applied to the pixel circuit, a display period includes a data writing-in phase and a light-emitting phase that are set successively, the driving method includes: in the data writing-in phase, writing, by the data writing-in circuit, the data voltage into the first end of the energy storage circuit under the control of the scan signal, and writing, by the second control circuit, a reference voltage provided by the reference voltage line to the second end of the light-emitting element under the control of the second control signal; writing, by the first control circuit, the first voltage signal provided by the first voltage line into the first end of the light-emitting element under the control of the first control signal; in the light-emitting phase, controlling, by the third control circuit, to connect the first end of the energy storage circuit and the control end of the driving circuit under the control of the third control signal, and controlling, by the first light-emitting control circuit, to connect the second end of the light-emitting element and the first voltage line under the control of the first light-emitting control signal, and driving, by the driving circuit, the light-emitting element to emit light under the control of the potential of the control end of the driving circuit.

In an embodiment of the present disclosure, the pixel circuit further comprises a second light-emitting control circuit and an initial control circuit; a display period further comprises a reset phase arranged before the data writing-in phase; the driving method further includes: in the reset phase, controlling, by the second light-emitting control circuit, to connect the second voltage line and the first end of the driving circuit under the control of the second light-emitting control signal; in the data writing-in phase, controlling, by the initial control circuit, to write the reference voltage into the control end of the driving circuit under the control of the initial control signal, so that when the data writing-in phase starts, the driving circuit controls to connect the first end of the driving circuit and the second end of the driving circuit under the control of the potential of the control end of the driving circuit, to change the potential of the first end of the driving circuit until the driving circuit is turned off; in the light-emitting phase, controlling, by the second light-emitting control circuit, to connect the second voltage line and the first end of the driving circuit under the control of the second light-emitting control signal.

In a third aspect, an embodiment of the present disclosure provides a driving method, applied to the pixel circuit, a display period includes a reset phase, a data writing-in phase and a light-emitting phase that are set successively, the driving method includes: in the reset phase and the data writing-in phase, controlling, by the first control circuit, to write the first voltage signal into the first end of the light-emitting element under the control of the first control signal, and controlling, by the second control circuit, to write the reference voltage to the second end of the light-emitting element under the control of the second control signal; in the data writing-in phase, writing, by the data writing-in circuit, the data voltage into the first end of the energy storage circuit under the control of the scan signal; in the light-emitting phase, controlling, by the third control circuit, to connect the first end of the energy storage circuit and the control end of the driving circuit under the control of the third control signal; controlling, by the first light-emitting control circuit, to connect the second end of the light-emitting element and the first voltage line under the control of the first light-emitting control signal, driving, by the driving circuit, the light-emitting element to emit light.

In an embodiment of the present disclosure, the pixel circuit further comprises a second light-emitting control circuit and an initial control circuit; the driving method further includes: in the data writing-in phase, writing, by the initial control circuit, a reference voltage into the control end of the driving circuit under the control of the initial control signal, so that when the data writing-in phase starts, the driving circuit controls to connect the first end of the driving circuit and the second end of the driving circuit under the control of the potential of the control end of the driving circuit, to change the potential of the first end of the driving circuit until the driving circuit is turned off; in the light-emitting phase, controlling, by the second light-emitting control circuit, to connect the second voltage line and the first end of the driving circuit under the control of the second light-emitting control signal.

In a fourth aspect, an embodiment of the present disclosure provides a display substrate including the pixel circuit.

In a fifth aspect, an embodiment of the present disclosure provides a display device comprising the display substrate.

DETAILED DESCRIPTION

The technical solutions in the embodiments of the present disclosure will be clearly and completely described below with reference to the accompanying drawings in the embodiments of the present disclosure. Obviously, the described embodiments are only a part of the embodiments of the present disclosure, but not all of the embodiments. Based on the embodiments in the present disclosure, all other embodiments obtained by those of ordinary skill in the art without creative efforts shall fall within the protection scope of the present disclosure.

The transistors used in all the embodiments of the present disclosure may be triodes, thin film transistors, field effect transistors, or other devices with the same characteristics. In the embodiments of the present disclosure, in order to distinguish the two electrodes of the transistor except the control electrode, one electrode is called the first electrode, and the other electrode is called the second electrode.

In actual operation, when the transistor is a thin film transistor or a field effect transistor, the first electrode may be a drain electrode, and the second electrode may be a source electrode; or, the first electrode may be a source electrode, the second electrode may be a drain electrode.

Figure 1:
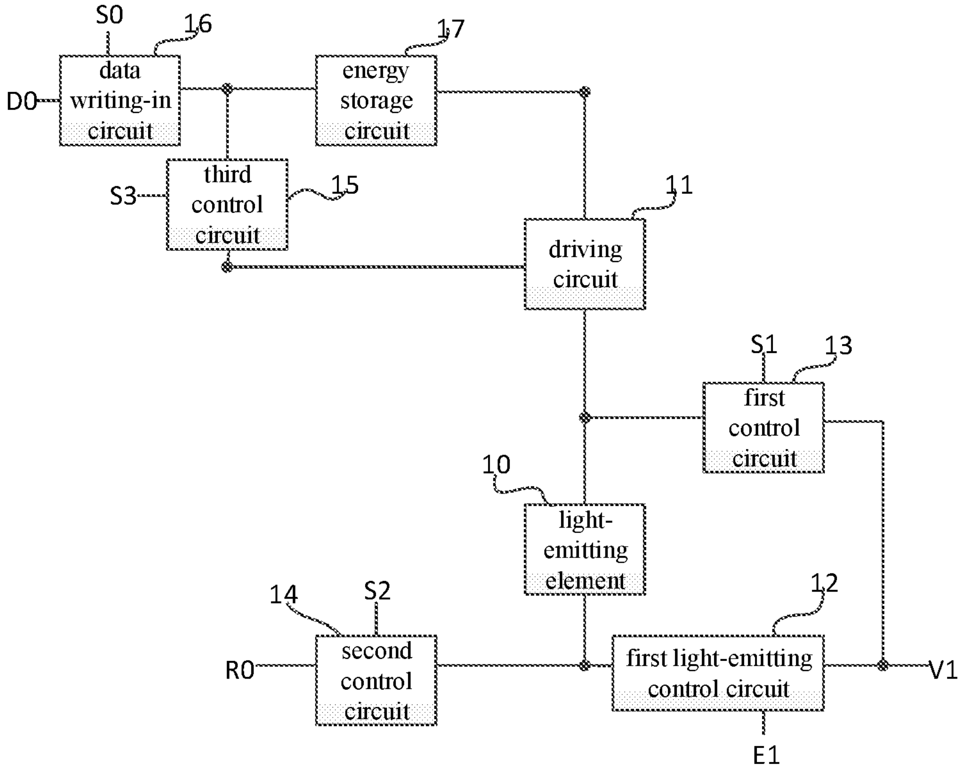
FIG. 1 is a structural diagram of a pixel circuit according to an embodiment of the present disclosure.

As shown in FIG. 1, the pixel circuit according to the embodiment of the present disclosure includes a driving circuit 11, a light-emitting element 10, a first light-emitting control circuit 12, a first control circuit 13, a second control circuit 14, a third control circuit 15, a data writing-in circuit 16 and an energy storage circuit 17;

The first control circuit 13 is electrically connected to a first control line S1, a first voltage line V1 and a second end of the driving circuit 11, respectively, and is configured to control to connect the first voltage line V1 and a first end of the light-emitting element 10 under the control of the first control signal provided by the first control line S1;

The first light-emitting control circuit 12 is respectively electrically connected to a first light-emitting control line E1, a second end of the light-emitting element 10 and a first voltage line V1, and is configured to control to connect the second end of the light-emitting element 10 and the first voltage line V1 under the control of a first light-emitting control signal provided by the first light-emitting control line E1;

The second control circuit 14 is electrically connected to a second control line S2, a reference voltage line R0 and the second end of the light-emitting element 10, respectively, is configured to control to connect the reference voltage line R0 and the second end of the light-emitting element 10 under the control of a second control signal provided by the second control line S2;

The third control circuit 15 is electrically connected to a third control line S3, a first end of the energy storage circuit 17 and a control end of the driving circuit 11, respectively, and is configured to control to connect the first end of the energy storage circuit 17 and the control end of the driving circuit 11 under the control of a third control signal provided by the third control line S3;

The data writing-in circuit 16 is electrically connected to a scan line S0, a data line D0 and the first end of the energy storage circuit 17, respectively, and is configured to control to write the data voltage Vd on the data line D0 into the first end of the energy storage circuit 17 under the control of a scan signal provided by the scan line S0;

The second end of the energy storage circuit 17 is electrically connected to the first end of the driving circuit 11, and the energy storage circuit 17 is used for storing electrical energy;

The second end of the driving circuit 11 is electrically connected to the first end of the light-emitting element 10; the driving circuit 11 is configured to control to connect the first end of the driving circuit 11 and the second end of the driving circuit 11 under the control of a potential of the control end of the driving circuit 11.

In at least one embodiment of the present disclosure, the first voltage line may be a low voltage line, and the first voltage signal may be a low voltage signal, but not limited thereto.

Optionally, the light-emitting element 10 may be an organic light-emitting diode, but not limited thereto.

When the pixel circuit shown in FIG. 1 of the present disclosure is in operation, the display period may include a data writing-in phase and a light-emitting phase that are set successively;

In the data writing-in phase, the data writing-in circuit 16 writes the data voltage Vd into the first end of the energy storage circuit 17 under the control of the scan signal, and the second control circuit 14 controls to write a reference voltage Vr provided by the reference voltage line R0 to the second end of the light-emitting element 10 under the control of the second control signal; the first control circuit 13 writes the first voltage signal provided by the first voltage line V1 into the first end of light-emitting element 10 under the control of the first control signal;

In the light-emitting phase, the third control circuit 15 controls to connect the first end of the energy storage circuit 17 and the control end of the driving circuit 11 under the control of the third control signal, and the first light-emitting control circuit 12 controls to connect the second end of the light-emitting element 10 and the first voltage line V1 under the control of a first light-emitting control signal, and the driving circuit 11 drives the light-emitting element 10 to emit light under the control of the potential of the control end of the driving circuit 11.

In the data writing-in phase, the first end of the light-emitting element 10 is connected to the first voltage signal, and the second end of the light-emitting element 10 is connected to the reference voltage Vr; in the light-emitting phase, the second end of the light-emitting element 10 is connected to the first voltage signal.

In the embodiment of the present disclosure, an H-bridge circuit is introduced at the two ends of the light-emitting element 10. In the light-emitting phase, the light-emitting element 10 can emit light normally. In the data writing-in phase, the first voltage signal flows into the first end of the light-emitting element 10, and the reference voltage Vr flows into the second end of the light-emitting element 10, the voltage value of the reference voltage Vr is greater than the voltage value of the first voltage signal, the first electrode may be an anode, and the second electrode may be a cathode, so that the positive charge of the anode and the negative charge of the cathode are eliminated in the data writing-in phase, so as to prolong the service life of the light-emitting element.

In at least one embodiment of the present disclosure, the auxiliary cathode process is used to form the first voltage line and the pixel circuit on a same back plate, and the first voltage line can be arranged in an effective display area, so that the first voltage line can participate in the compensation of the pixel circuit.

In actual operation, the first voltage line may be lapped on the anode layer and the cathode layer from the source-drain metal layer upward successively, but it is not limited thereto.

Through the auxiliary cathode process, in the pixel circuit described in at least one embodiment of the present disclosure, the first voltage signal provided by the first voltage line can be written into the first end of the light-emitting element 10 through the first control circuit 13;

In the data writing-in phase, the first voltage signal is written into the first end of the light-emitting element 10 through the first control circuit 13, and the reference voltage Vr is written into the second end of the light-emitting element through the second control circuit 14. A reference voltage Vr with a low voltage value can make the light-emitting element 10 to be a reverse bias state, which can save power consumption and improve the reliability of the TFT.

In at least one embodiment of the present disclosure, the voltage value of the first voltage signal may be −3V or −4V, and the voltage value of the reference voltage Vr may be 0V, but not limited thereto.

In at least one embodiment of the present disclosure, the voltage value of the reference voltage Vr may be greater than or equal to −3V and less than or equal to 3V, and the voltage value of the first voltage signal may be greater than or equal to −5V and less than or equal to −2V; but not limited to this;

The difference between the voltage value of the first voltage signal and the voltage value of the reference voltage Vr may be greater than or equal to −8V and less than or equal to −2V, but not limited thereto.

In at least one embodiment of the present disclosure, the pixel circuit may further include a second light-emitting control circuit and an initial control circuit;

The second light-emitting control circuit is respectively electrically connected to the second light-emitting control line, the second voltage line and the first end of the driving circuit, and is configured to control to connect the first end of the driving circuit and the second voltage line under the control of a second light-emitting control signal provided by the second light-emitting control line;

The initial control circuit is respectively electrically connected to the initial control line, and the control end of the driving circuit and the reference voltage line, is configured to connect the reference voltage line and the control end of the driving circuit under the control of the initial control signal provided by the initial control line.

In a specific implementation, the second light-emitting control circuit can control to connect the first end of the driving circuit and the second voltage line in the light-emitting phase, and the initial control circuit can write the reference voltage into the control end of the driving circuit in the data writing-in phase, so that when the data writing-in phase starts, the driving circuit can connect the first end of the driving circuit and the second end of the driving circuit under the control of the potential of the control end of the driving circuit.

In at least one embodiment of the present disclosure, the second voltage line may be a high voltage line, but not limited thereto.

Figure 2:
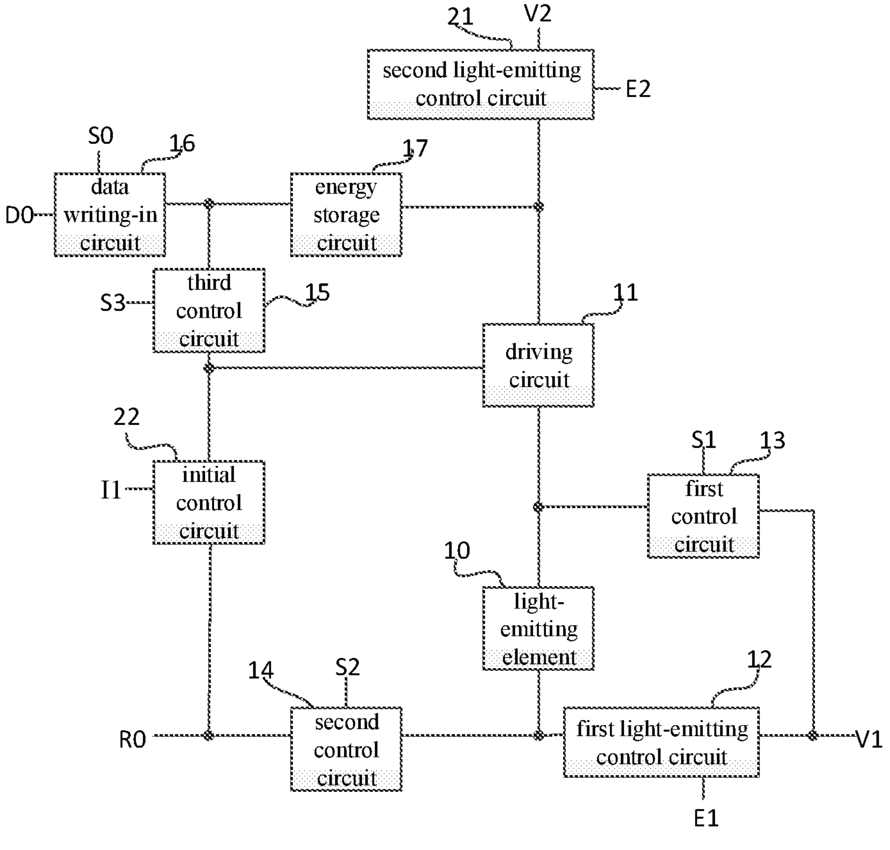
FIG. 2 is a structural diagram of a pixel circuit according to at least one embodiment of the present disclosure.

As shown in FIG. 2, on the basis of the embodiment of the pixel circuit shown in FIG. 1, the pixel circuit described in at least one embodiment of the present disclosure may further include a second light-emitting control circuit 21 and an initial control circuit 22;

The second light-emitting control circuit 21 is respectively electrically connected to the second light-emitting control line E2, the second voltage line V2 and the first end of the driving circuit 11, and is configured to connect the first end of the driving circuit 11 and the second voltage line V2 under the control of the second light-emitting control signal provided by the second light-emitting control line E2;

The initial control circuit 22 is respectively electrically connected to the initial control line I1, and the control end of the driving circuit 11 and the reference voltage line R0, and is configured to control to connect the reference voltage line R0 and the control end of the driving circuit 11 under the control of the initial control signal provided by the initial control line I1.

When the pixel circuit shown in FIG. 2 of the present disclosure is in operation, the display period may further include a reset phase arranged before the data writing-in phase;

In the reset phase, the second light-emitting control circuit 21 controls to connect the second voltage line V2 and the first end of the driving circuit 11 under the control of the second light-emitting control signal;

In the data writing-in phase, the initial control circuit 22 controls to write the reference voltage Vr provided by R0 into the control end of the driving circuit 11 under the control of the initial control signal, so that when the data writing-in phase starts, the driving circuit 11 can connect the first end of the driving circuit 11 and the second end of the driving circuit 11 under the control of the potential of the control end of the driving circuit 11, so as to change the potential of the first end of the driving circuit 11 until the driving circuit 11 is turned off;

In the light-emitting phase, the second light-emitting control circuit 21 controls to connect the second voltage line V2 and the first end of the driving circuit 11 under the control of the second light-emitting control signal, and the driving circuit 11 drives the light-emitting element 10 to emit light.

Optionally, the transistors included in the pixel circuit are all p-type transistors, and the third control line S3 and the first light-emitting control line E1 may be the same signal line; the first control line S1, the second control line S2, the scan line S0, and the initial control line I1 may be the same signal line, so as to reduce the number of signal lines used by the pixel circuit according to at least one embodiment of the present disclosure, thereby reducing the number of GOA circuits (the GOA circuit is used to provide the light-emitting control signal and the scan signal).

Optionally, the transistors included in the first light-emitting control circuit 12 and the transistors included in the second light-emitting control circuit 21 are p-type transistors; the transistors included in the third control circuit 13 are p-type transistors, and the transistors included in the fourth control circuit 14 are n-type transistors; the first light-emitting control line E1, the second light-emitting control line E2, the second control line S2 and the third control line S3 are the same signal line;

The transistors included in the data writing-in circuit 16 are n-type transistors, the transistors included in the initial control circuit 22 are n-type transistors, and the scan line S0 and the initial control line I1 are the same signal line.

Through the above configuration of transistor types, the first light-emitting control line, the second light-emitting control line, the second control line and the third control line can be the same signal line, and the scan line and the initial control line can be the same signal line, so as to reduce the number of signal lines used by the pixel circuit according to at least one embodiment of the present disclosure, thereby reducing the number of GOA circuits.

Optionally, the first control circuit includes a first transistor, the second control circuit includes a second transistor, and the first light-emitting control circuit includes a third transistor;

A control electrode of the first transistor is electrically connected to the first control line, a first electrode of the first transistor is electrically connected to the first voltage line, and a second electrode of the first transistor is electrically connected to the second end of the driving circuit;

A control electrode of the second transistor is electrically connected to the second control line, a first electrode of the second transistor is electrically connected to the reference voltage line, and a second electrode of the second transistor is electrically connected to the second end of the light-emitting element;

A control electrode of the third transistor is electrically connected to the first light-emitting control line, a first electrode of the third transistor is electrically connected to the first voltage line, and a second electrode of the third transistor is electrically connected to the second end of the light-emitting element.

Optionally, the third control circuit includes a fourth transistor, the data writing-in circuit includes a fifth transistor, and the energy storage circuit includes a storage capacitor;

A control electrode of the fourth transistor is electrically connected to the third control line, a first electrode of the fourth transistor is electrically connected to a first end of the storage capacitor, and a second electrode of the fourth transistor is electrically connected to the control end of the driving circuit;

A control electrode of the fifth transistor is electrically connected to the scan line, a first electrode of the fifth transistor is electrically connected to the data line, and a second electrode of the fifth transistor is electrically connected to the first end of the storage capacitor;

A second end of the storage capacitor is electrically connected to the first end of the driving circuit.

Optionally, the second light-emitting control circuit includes a sixth transistor, and the initial control circuit includes a seventh transistor;

A control electrode of the sixth transistor is electrically connected to the second light-emitting control line, a first electrode of the sixth transistor is electrically connected to the second voltage line, and a second electrode of the sixth transistor is electrically connected to the first electrode of the driving transistor;

A control electrode of the seventh transistor is electrically connected to the initial control line, a first electrode of the seventh transistor is electrically connected to the reference voltage line, and a second electrode of the seventh transistor is electrically connected to the control end of the driving circuit.

Optionally, the driving circuit includes a driving transistor;

A control electrode of the driving transistor is the control end of the driving circuit, a first electrode of the driving transistor is the first end of the driving circuit, and a second electrode of the driving circuit is the second end of the driving circuit.

Figure 3:
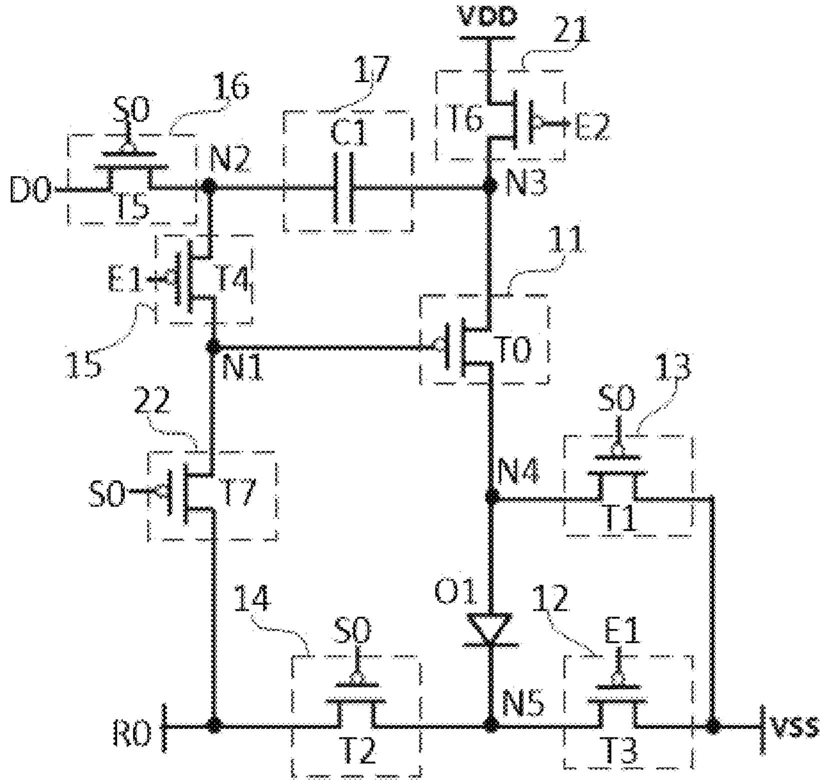
FIG. 3 is a circuit diagram of a pixel circuit according to at least one embodiment of the present disclosure.

As shown in FIG. 3, based on at least one embodiment of the pixel circuit shown in FIG. 2, the first control circuit 13 includes a first transistor T1, and the second control circuit 14 includes a second transistor T2, the first light-emitting control circuit 12 includes a third transistor T3; the third control circuit 15 includes a fourth transistor T4, the data writing-in circuit 16 includes a fifth transistor T5, and the energy storage circuit 17 includes a storage capacitor C1; the second light-emitting control circuit 21 includes a sixth transistor T6, the initial control circuit 22 includes a seventh transistor T7; the driving circuit 11 includes a driving transistor T0; the light-emitting element is an organic light-emitting diode O1;

The gate electrode of the first transistor T1 is electrically connected to the scan line S0, the source electrode of the first transistor T1 is electrically connected to the low voltage line VSS, and the drain electrode of the first transistor T1 is electrically connected to the drain electrode of the driving transistor T0;

The gate electrode of the second transistor T2 is electrically connected to the scan line S0, the source electrode of the second transistor T2 is electrically connected to the reference voltage line R0, and the drain electrode of the second transistor T2 is electrically connected to the cathode of the organic light emitting diode;

The gate electrode of the third transistor T3 is electrically connected to the first light-emitting control line E1, the drain electrode of the third transistor T3 is electrically connected to the cathode of the organic light emitting diode O1, and the source electrode of the third transistor T3 is electrically connected to the low voltage line VSS;

The gate electrode of the fourth transistor T4 is electrically connected to the first light-emitting control line E1, the source electrode of the fourth transistor T4 is electrically connected to the first end of the storage capacitor C1, and the drain electrode of the fourth transistor T4 is electrically connected to the gate electrode of the driving transistor T0;

The gate electrode of the fifth transistor T5 is electrically connected to the scan line S0, the source electrode of the fifth transistor T5 is electrically connected to the data line D0, and the drain electrode of the fifth transistor T5 is electrically connected to the first end of the storage capacitor C1;

The second end of the storage capacitor C1 is electrically connected to the source electrode of the driving transistor T0;

The gate electrode of the sixth transistor T6 is electrically connected to the second light-emitting control line E2, the source electrode of the sixth transistor T6 is electrically connected to the high voltage line VDD, and the drain electrode of the sixth transistor T6 is electrically connected to the source electrode of the driving transistor T0;

The gate electrode of the seventh transistor T7 is electrically connected to the scan line S0, the source electrode of the seventh transistor T7 is electrically connected to the reference voltage line R0, and the drain electrode of the seventh transistor T7 is electrically connected to the gate electrode of the driving transistor T0;

The gate electrode of the driving transistor T0 is electrically connected to the first node N1, the source electrode of the driving transistor T0 is electrically connected to the third node N3, and the drain electrode of the driving transistor T0 is electrically connected to the fourth node N4;

The first end of C1 is electrically connected to the second node N2, and the cathode of O1 is electrically connected to the fifth node N5.

In the pixel circuit shown in FIG. 3, all the transistors may be low temperature polysilicon thin film transistors, and all the transistors are p-type transistors, but not limited thereto.

In at least one embodiment of the pixel circuit shown in FIG. 3, the reference voltage line R0 is used to provide the reference voltage Vr, the low voltage line VSS is used to provide the low voltage signal, and the voltage value of Vr may be 0V, so the voltage value of the low voltage signal may be −3V or −4V, but not limited thereto.

Figure 4A:
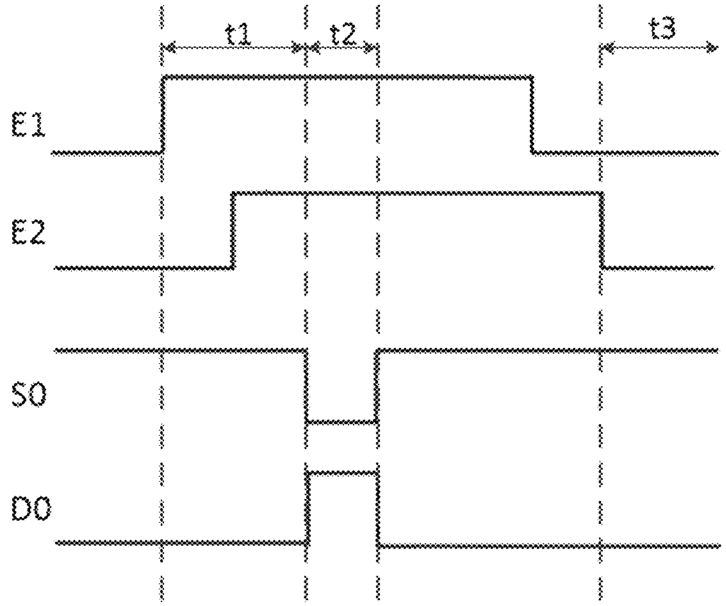
FIG. 4A is a timing diagram of the pixel circuit shown in FIG. 3 according to at least one embodiment of the present disclosure.
Figure 5A:
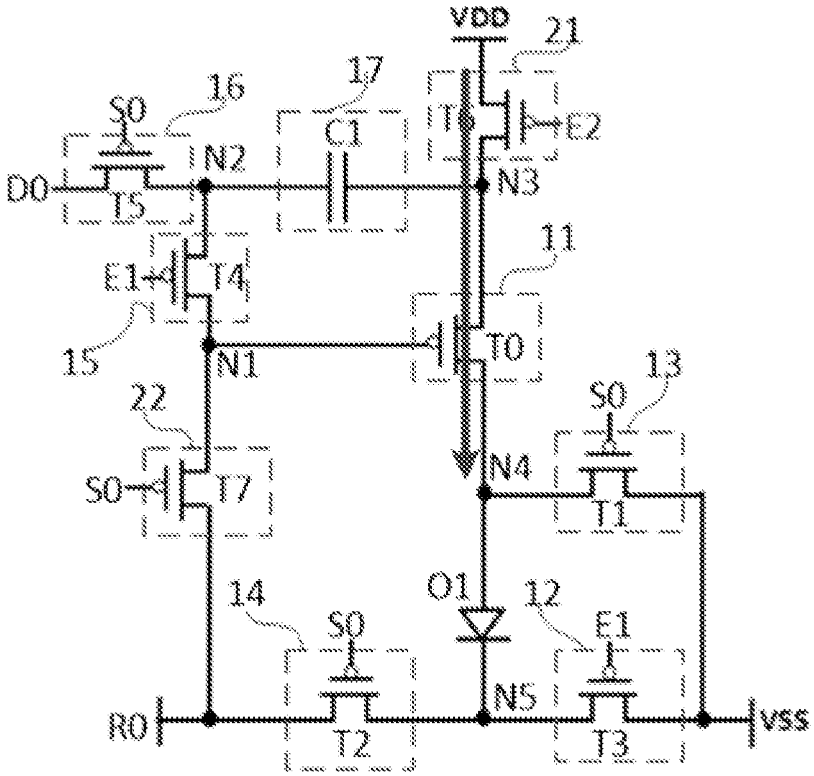
FIG. 5A is a schematic diagram of a working state of a the pixel circuit shown in FIG. 3 in a reset phase t1 according to at least one embodiment of the present disclosure.
Figure 5B:
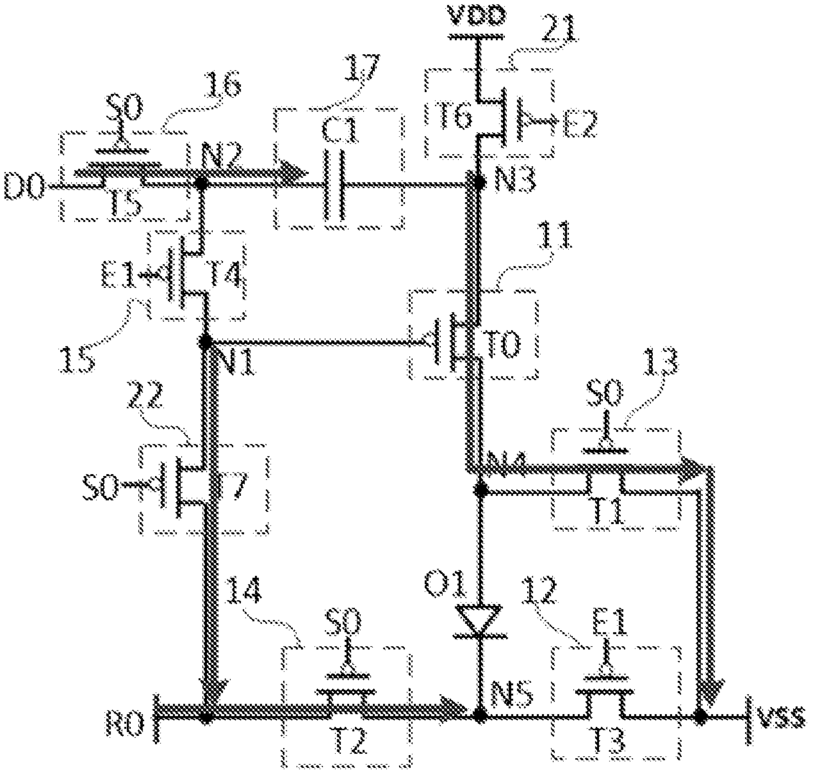
FIG. 5B is a schematic diagram of a working state of a the pixel circuit shown in FIG. 3 in a data writing-in phase t2 according to at least one embodiment of the present disclosure.
Figure 5C:
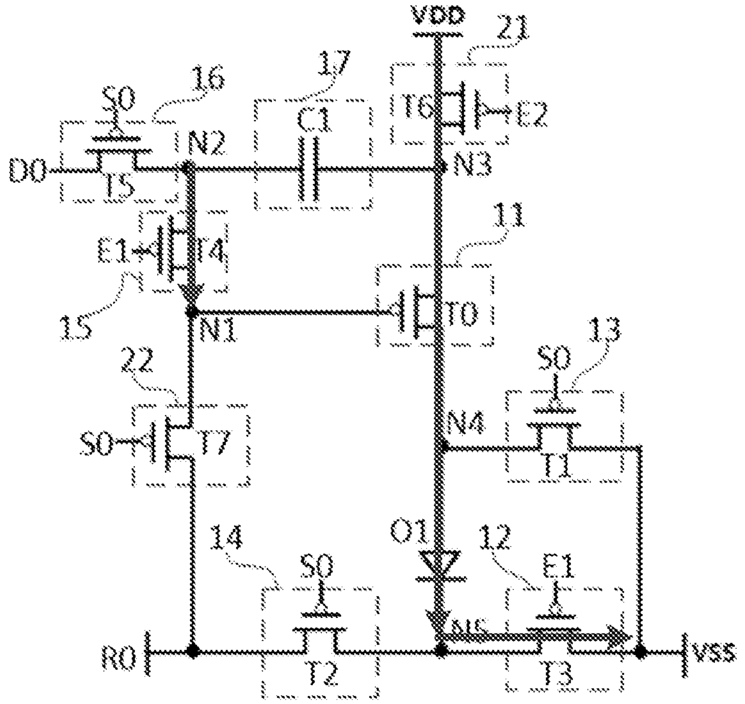
FIG. 5C is a schematic diagram of a working state of a the pixel circuit shown in FIG. 3 in a light-emitting phase t3 according to at least one embodiment of the present disclosure.

As shown in FIG. 4A, when the pixel circuit shown in FIG. 3 of the present disclosure is in operation, the display period may include a reset phase t1, a data writing-in phase t2, and a light-emitting phase t3 that are set successively;

In the reset phase t1, E1 provides a high voltage signal, E2 provides a low voltage signal, and S0 provides a high voltage signal. As shown in FIG. 5A, T6 is turned on, and the high voltage signal provided by VDD flows into O1 through T0, to enable O1 to emit light. At this time, the brightness of O1 is the brightness in the previous frame, then E2 provides a high voltage signal, T6 is turned off, O1 stops emitting light, the potential of N3 remains at the voltage value VD of the high voltage signal;

In the data writing-in phase t2, E1 provides a high voltage signal, E2 provides a high voltage signal, S0 provides a low voltage signal, D0 provides the data voltage Vd, and R0 provides the reference voltage Vr, as shown in FIG. 5B, T5 is turned on, and Vd is written N2, T7, T2 and T1 are turned on to write Vr into N1 and N5, T0 is turned on, and the voltage of N3 is gradually lowered by discharging to VSS until the potential of N3 becomes Vr−Vth, and T0 is turned off, at this time, the potential of N4 is VS, the potential of N5 is Vr, the potential of N4 is less than the potential of N5, and the process of reverse charging is realized; wherein, Vth is the threshold voltage of T0;

In the light-emitting phase t3, both E1 and E2 provide low voltage signals, S0 provides a high voltage signal, as shown in FIG. 5C, T4 is turned on, T3 and T6 are turned on, and the potential of N3 is restored to VD (VD is the voltage value of the high voltage signal provided by VDD), due to the bootstrap effect of capacitor, the change amount of the potential of N3 is Vr−Vth+VD, and the potential of N2 becomes Vd−Vr+Vth+VD. Since T4 is turned on, the potential of N1 is the same as the potential of N2;

In the light-emitting phase t3, the calculation formula of the current value I of the driving circuit where T0 drives O1 to emit light is as follows:

$$I = K(V_{N1} - V_{N3} - Vth)^2 = K(Vd - Vr + Vth + VD - VD - Vth)^2 = K(Vd - Vr)^2$$

$V_{N1}$ is the potential of N1 in the light-emitting phase t3, $V_{N2}$ is the potential of N2 in the light-emitting phase t3, and K is the current coefficient of T0;

$$K = \frac{1}{2}\mu C_{ox}\frac{W}{L};$$

μ is the mobility of hole carriers, Cox is the capacitance per unit area of the gate insulating layer, and W/L is the width to length ratio of T0.

It can be seen from the above formula that I is only related to Vd and Vr, and is not related to VD and Vth.

In at least one embodiment of the present disclosure, Vth may be, for example, −2V, but not limited thereto.

In at least one embodiment of the present disclosure, the voltage value of the high voltage signal provided by VDD may be greater than 0V and less than or equal to 7V; Vth may be greater than or equal to −2.5V and less than or equal to −1.5V; but not limited thereto.

During operation of the pixel circuit shown in FIG. 3 of the present disclosure, In the reset phase t1, the potential of N1 and the potential of N2 are the voltages in the previous frame, the potential of N3 is VD, the potential of N4 is $V_{oled\_AND}$, and the potential of N5 is VS (VS is the voltage value of the low voltage signal provided by VSS); $V_{oled\_AND}$ is the voltage of the anode of O1;

In the data writing-in phase t2, the potential of N1 is Vr, the potential of N2 is Vd, the potential of N3 is Vr−Vth, the potential of N4 is VS, and the potential of N5 is Vr;

In the light-emitting phase t3, the potential of N1 and the potential of N2 are both Vd−Vr+Vth+VD, the potential of N3 is VD, the potential of N4 is $V_{oled\_AND}$, and the potential of N5 is VS.

Figure 6:
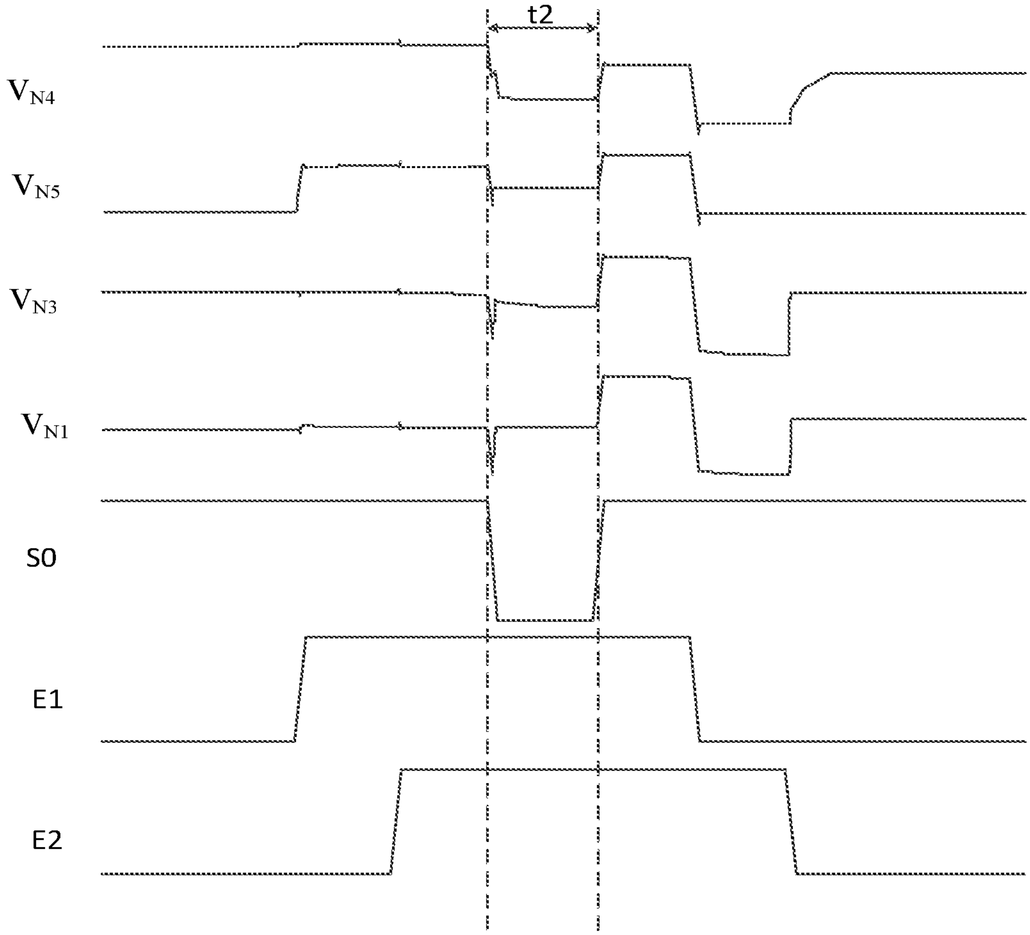
FIG. 6 is a simulation timing diagram of the pixel circuit shown in FIG. 3 according to at least one embodiment of the present disclosure.

At least one embodiment of the pixel circuit shown in FIG. 3 of the present disclosure is simulated, Vd is designed to be −1V, VD is 4.6V, the voltage value of Vr is 0V, and Vth is −2.5V. It is calculated that the potential of N1 is 1.1V in the light-emitting phase, which is consistent with the simulation results;

As shown in FIG. 6, in the data writing-in phase t2, the voltage difference between the potential of N4 and the potential of N5 is −4V, which can achieve the effect of PCV driving, and the negative voltage can be maintained until the beginning of the light-emitting phase.

In FIG. 6, $V_{N4}$ is the potential of N4, $V_{N5}$ is the potential of N5, $V_{N1}$ is the potential of N1, and $V_{N3}$ is the potential of N3.

In at least one embodiment of the present disclosure, a Low Temperature Polycrystalline Oxide (LTPO) solution can be used. The LTPO solution has the advantages of fast movement of polycrystalline silicon carriers and low current leakage of oxide transistors, so as to meet the low frequency and high frequency driving mode, on the basis of the H-bridge driving circuit, at least one embodiment of the present disclosure introduces oxide transistors into the pixel circuit, which can realize high and low frequency driving, and can also prolong the PCV driving time, and further increase the service life of the light-emitting element.

During operation of the pixel circuit shown in FIG. 3 of the present disclosure, the first light-emitting control signal provided by E1 and the second light-emitting control signal provided by E2 may be the same light-emitting control signal.

Figure 4B:
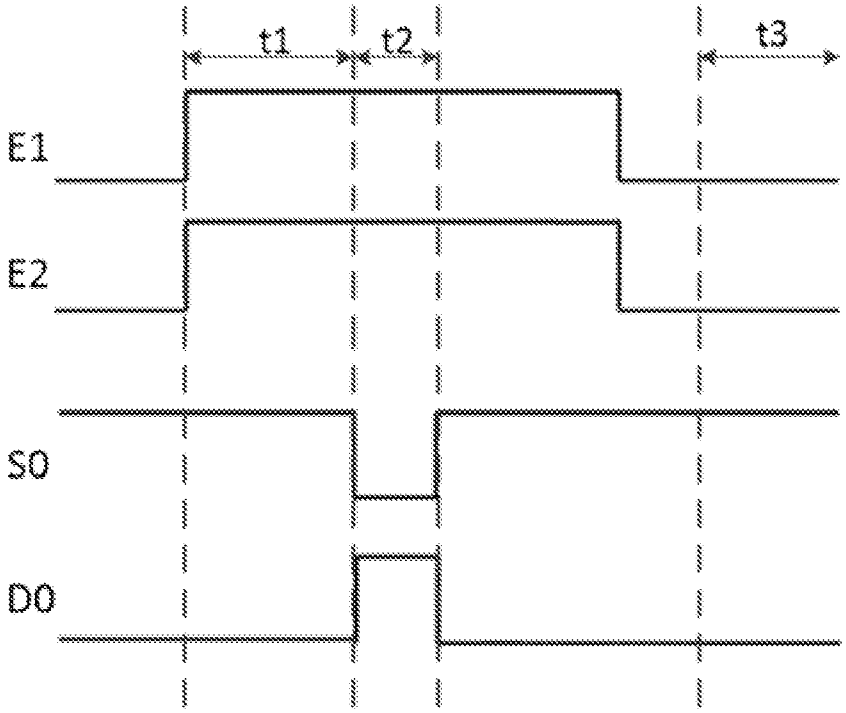
FIG. 4B is another timing diagram of the pixel circuit shown in FIG. 3 according to at least one embodiment of the present disclosure.

As shown in FIG. 4B, when the pixel circuit shown in FIG. 3 of the present disclosure is in operation, The display period may include a reset phase t1, a data writing-in phase t2 and a light-emitting phase t3 that are set successively;

In the reset phase t1, E1 provides a high voltage signal, E2 provides a high voltage signal, S0 provides a high voltage signal, T6 is turned off, and O1 stops emitting light;

In the data writing-in phase t2, E1 provides a high voltage signal, E2 provides a high voltage signal, S0 provides a low voltage signal, D0 provides the data voltage Vd, R0 provides the reference voltage Vr, T5 is turned on, and Vd is written to N2, T7, T2 and T1 is turned on to write Vr into N1 and N5, T0 is turned on, and the voltage of N3 is gradually decreased by discharging to VSS until the potential of N3 becomes Vr−Vth, T0 is turned off, at this time the potential of N4 is VS, and the potential of N5 is Vr, the potential of N4 is less than the potential of N5, and the process of reverse charging is realized; wherein, Vth is the threshold voltage of T0;

In the light-emitting phase t3, both E1 and E2 provide a low voltage signal, S0 provides a high voltage signal, T4 is turned on, T3 and T6 are turned on, and the potential of N3 is restored to VD (VD is the voltage value of the high voltage signal provided by VDD), due to the bootstrap effect of capacitor, the change amount of the potential of N3 is Vr−Vth+VD, and the potential of N2 becomes Vd−Vr+Vth+VD. Since T4 is turned on, the potential of N1 is the same as the potential of N2;

In the light-emitting phase t3, the calculation formula of the current value I of the driving circuit where T0 drives O1 to emit light is as follows:

$$I = K(V_{N1} - V_{N3} - Vth)^2 = K(Vd - Vr + Vth + VD - VD - Vth)^2 = K(Vd - Vr)^2$$

$V_{N1}$ is the potential of N1 in the light-emitting phase t3, $V_{N2}$ is the potential of N2 in the light-emitting phase t3, and K is the current coefficient of T0;

$$K = \frac{1}{2}\mu C_{ox}\frac{W}{L};$$

μ is the mobility of hole carriers, Cox is the capacitance per unit area of the gate insulating layer, and W/L is the width to length ratio of T0.

It can be seen from the above formula that I is only related to Vd and Vr, and is not related to VD and Vth.

Figure 4C:
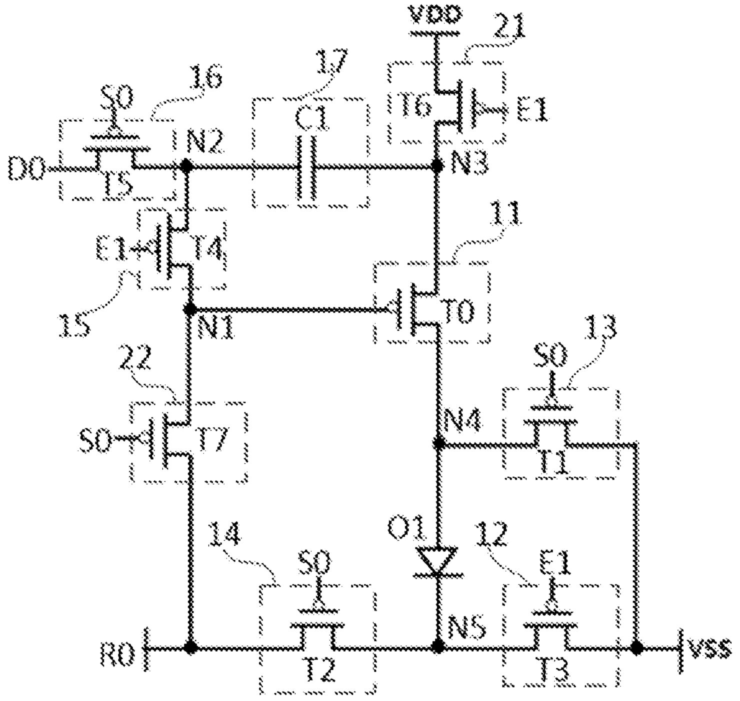
FIG. 4C is a circuit diagram of a pixel circuit according to at least one embodiment of the present disclosure.

As shown in FIG. 4C, based on at least one embodiment of the pixel circuit shown in FIG. 2, the first control circuit 13 includes a first transistor T1, and the second control circuit 14 includes a second transistor T2, so the first light-emitting control circuit 12 includes a third transistor T3; the third control circuit 15 includes a fourth transistor T4, the data writing-in circuit 16 includes a fifth transistor T5, and the energy storage circuit 17 includes a storage capacitor C1; the second light-emitting control circuit 21 includes a sixth transistor T6, the initial control circuit 22 includes a seventh transistor T7; the driving circuit 11 includes a driving transistor T0; the light-emitting element is an organic light-emitting diode O1;

The gate electrode of the first transistor T1 is electrically connected to the scan line S0, the source electrode of the first transistor T1 is electrically connected to the low voltage line VSS, and the drain electrode of the first transistor T1 is electrically connected to the drain electrode of the driving transistor T0;

The gate electrode of the second transistor T2 is electrically connected to the scan line S0, the source electrode of the second transistor T2 is electrically connected to the reference voltage line R0, and the drain electrode of the second transistor T2 is electrically connected to the cathode of the organic light emitting diode;

The gate electrode of the third transistor T3 is electrically connected to the first light-emitting control line E1, the drain electrode of the third transistor T3 is electrically connected to the cathode of the organic light emitting diode O1, and the source electrode of the third transistor T3 is electrically connected to the low voltage line VSS;

The gate electrode of the fourth transistor T4 is electrically connected to the first light-emitting control line E1, the source electrode of the fourth transistor T4 is electrically connected to the first end of the storage capacitor C1, and the drain electrode of the fourth transistor T4 is electrically connected to the gate electrode of the driving transistor T0;

The gate electrode of the fifth transistor T5 is electrically connected to the scan line S0, the source electrode of the fifth transistor T5 is electrically connected to the data line D0, and the drain electrode of the fifth transistor T5 is electrically connected to the first end of the storage capacitor C1;

The second end of the storage capacitor C1 is electrically connected to the source electrode of the driving transistor T0;

The gate electrode of the sixth transistor T6 is electrically connected to the first light-emitting control line E1, the source electrode of the sixth transistor T6 is electrically connected to the high voltage line VDD, and the drain electrode of the sixth transistor T6 is electrically connected to the source electrode of the drive transistor T0;

The gate electrode of the seventh transistor T7 is electrically connected to the scan line S0, the source electrode of the seventh transistor T7 is electrically connected to the reference voltage line R0, and the drain electrode of the seventh transistor T7 is electrically connected to the gate electrode of the driving transistor T0;

The gate electrode of the driving transistor T0 is electrically connected to the first node N1, the source electrode of the driving transistor T0 is electrically connected to the third node N3, and the drain electrode of the driving transistor T0 is electrically connected to the fourth node N4;

The first end of C1 is electrically connected to the second node N2, and the cathode of O1 is electrically connected to the fifth node N5.

In at least one embodiment of the pixel circuit shown in FIG. 4C, the transistors may all be low temperature polysilicon thin film transistors, and all the transistors are p-type transistors, but not limited thereto.

In at least one embodiment of the pixel circuit shown in FIG. 4C, the reference voltage line R0 is used to provide the reference voltage Vr, the low voltage line VSS is used to provide the low voltage signal, and the voltage value of Vr may be 0V, so the voltage value of the low voltage signal may be −3V or −4V, but not limited thereto.

In at least one embodiment of the pixel circuit shown in FIG. 4C, the second light-emitting control line may be the first light-emitting control line E1, that is, the first light-emitting control line and the second light-emitting control line are the same light-emitting control line.

Figure 4D:
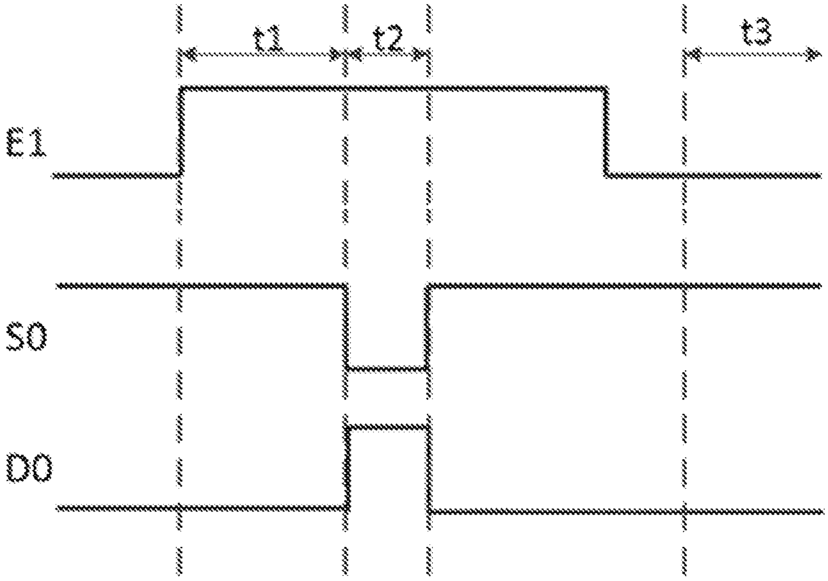
FIG. 4D is a timing diagram of the pixel circuit shown in FIG. 4C according to at least one embodiment of the present disclosure.

As shown in FIG. 4D, when at least one embodiment of the pixel circuit shown in FIG. 4C of the present disclosure is in operation, The display period may include a reset phase t1, a data writing-in phase t2 and a light-emitting phase t3 that are set successively;

In the reset phase t1, E1 provides a high voltage signal, S0 provides a high voltage signal, T6 is turned off, and O1 stops emitting light;

In the data writing-in phase t2, E1 provides a high voltage signal, S0 provides a low voltage signal, D0 provides the data voltage Vd, R0 provides the reference voltage Vr, T5 is turned on, Vd is written to N2, T7, T2 and T1 are turned on to write the Vr into N1 and N5, T0 is turned on, and the voltage of N3 is gradually reduced by discharging to VSS until the potential of N3 becomes Vr−Vth, and T0 is turned off. At this time, the potential of N4 is VS, the potential of N5 is Vr, and the potential of N4 is less than the potential of N5 to realize the process of reverse charging; wherein, Vth is the threshold voltage of T0;

In the light-emitting phase t3, E1 is a low voltage signal, S0 provides a high voltage signal, T4 is turned on, T3 and T6 are turned on, and the potential of N3 is restored to VD (VD is the voltage value of the high voltage signal provided by VDD), due to the bootstrap effect of capacitor, the change of the potential of N3 is Vr−Vth+VD, the potential of N2 becomes Vd−Vr+Vth+VD, since T4 is turned on, the potential of N1 is the same as the potential of N2;

In the light-emitting phase t3, the calculation formula of the current value I of the driving circuit where T0 drives O1 to emit light is as follows:

$$= K(V_{N1} - V_{N3} - Vth)^2 = K(Vd - Vr + Vth + VD - VD - Vth)^2 = K(Vd - Vr)^2$$

$V_{N1}$ is the potential of N1 in the light-emitting phase t3, $V_{N2}$ is the potential of N2 in the light-emitting phase t3, and K is the current coefficient of T0;

$$K = \frac{1}{2}\mu C_{ox}\frac{W}{L};$$

μ is the mobility of hole carriers, Cox is the capacitance per unit area of the gate insulating layer, and W/L is the width to length ratio of T0.

It can be seen from the above formula that I is only related to Vd and Vr, and is not related to VD and Vth.

Figure 7:
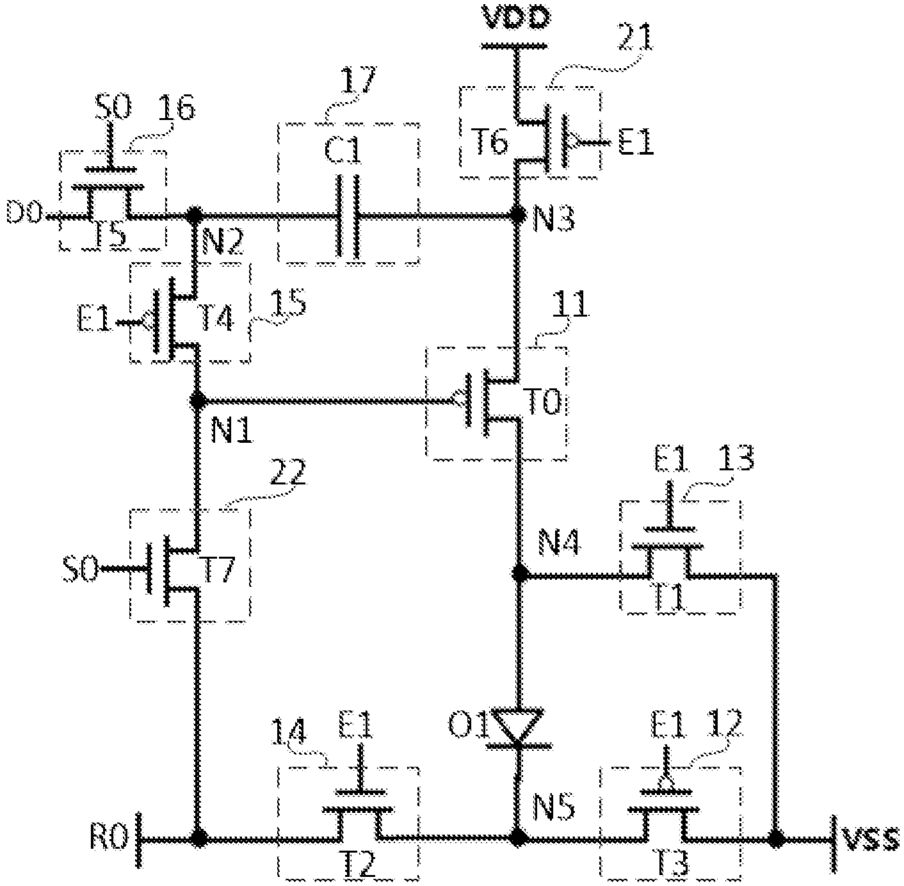
FIG. 7 is a circuit diagram of a pixel circuit according to at least one embodiment of the present disclosure.

As shown in FIG. 7, based on at least one embodiment of the pixel circuit shown in FIG. 2, the first control circuit 13 includes a first transistor T1, and the second control circuit 14 includes a second transistor T2, the first light-emitting control circuit 12 includes a third transistor T3; the third control circuit 15 includes a fourth transistor T4, the data writing-in circuit 16 includes a fifth transistor T5, and the energy storage circuit 17 includes a storage capacitor C1; the second light-emitting control circuit 21 includes a sixth transistor T6, the initial control circuit 22 includes a seventh transistor T7; the driving circuit 11 includes a driving transistor T0; the light-emitting element is an organic light-emitting diode O1;

The gate electrode of the first transistor T1 is electrically connected to the first light-emitting control line E1, the source electrode of the first transistor T1 is electrically connected to the low voltage line VSS, and the drain electrode of the first transistor T1 is electrically connected to the drain electrode of the driving transistor T0;

The gate electrode of the second transistor T2 is electrically connected to the first light-emitting control line E1, the source electrode of the second transistor T2 is electrically connected to the reference voltage line R0, and the drain electrode of the second transistor T2 is electrically connected to the cathode of the organic light emitting diode;

The gate electrode of the third transistor T3 is electrically connected to the first light-emitting control line E1, the drain electrode of the third transistor T3 is electrically connected to the cathode of the organic light emitting diode O1, and the source electrode of the third transistor T3 is electrically connected to the low voltage line VSS;

The gate electrode of the fourth transistor T4 is electrically connected to the first light-emitting control line E1, the source electrode of the fourth transistor T4 is electrically connected to the first end of the storage capacitor C1, and the drain electrode of the fourth transistor T4 is electrically connected to the gate electrode of the driving transistor T0;

The gate electrode of the fifth transistor T5 is electrically connected to the scan line S0, the source electrode of the fifth transistor T5 is electrically connected to the data line D0, and the drain electrode of the fifth transistor T5 is electrically connected to the first end of the storage capacitor C1;

The second end of the storage capacitor C1 is electrically connected to the source electrode of the driving transistor T0;

The gate electrode of the sixth transistor T6 is electrically connected to the first light-emitting control line E1, the source electrode of the sixth transistor T6 is electrically connected to the high voltage line VDD, and the drain electrode of the sixth transistor T6 is electrically connected to the source electrode of the driving transistor T0;

The gate electrode of the seventh transistor T7 is electrically connected to the scan line S0, the source electrode of the seventh transistor T7 is electrically connected to the reference voltage line R0, and the drain electrode of the seventh transistor T7 is electrically connected to the gate electrode of the driving transistor T0;

The gate electrode of the driving transistor T0 is electrically connected to the first node N1, the source electrode of the driving transistor T0 is electrically connected to the third node N3, and the drain electrode of the driving transistor T0 is electrically connected to the fourth node N4;

The first end of C1 is electrically connected to the second node N2, and the cathode of O1 is electrically connected to the fifth node N5.

In at least one embodiment of the pixel circuit shown in FIGS. 7, T7, T5, T1 and T2 are all oxide thin film transistors, and T0, T3, T4 and T6 are all low temperature polysilicon thin film transistors;

T7, T5, T1 and T2 are n-type transistors, and T0, T3, T4 and T6 are p-type transistors.

In at least one embodiment of the pixel circuit shown in FIG. 7, T7 is electrically connected to N1, and T5 is electrically connected to storage capacitor C1. After replacing T7 and T5 with oxide thin film transistors, the current leakage is reduced, and low-frequency driving can be realized;

After replacing T1 and T2 with oxide thin film transistors, the gate electrode of T1 and the gate electrode of T2 are changed to be electrically connected to the first light-emitting control line E1, because in the actual application process, the pulse width of the first light-emitting control signal provided by E1 is much longer than the pulse width of the scan signal provided by S0, so the time for applying a negative voltage to the anode of O1 will be prolonged, which is more conducive to improving the service life of O1.

In at least one embodiment of the pixel circuit shown in FIG. 7, the voltage value of the high voltage signal provided by VDD is VD, the voltage value of the low voltage signal provided by VSS is VS, and the threshold voltage of T0 is Vth.

Figure 8:
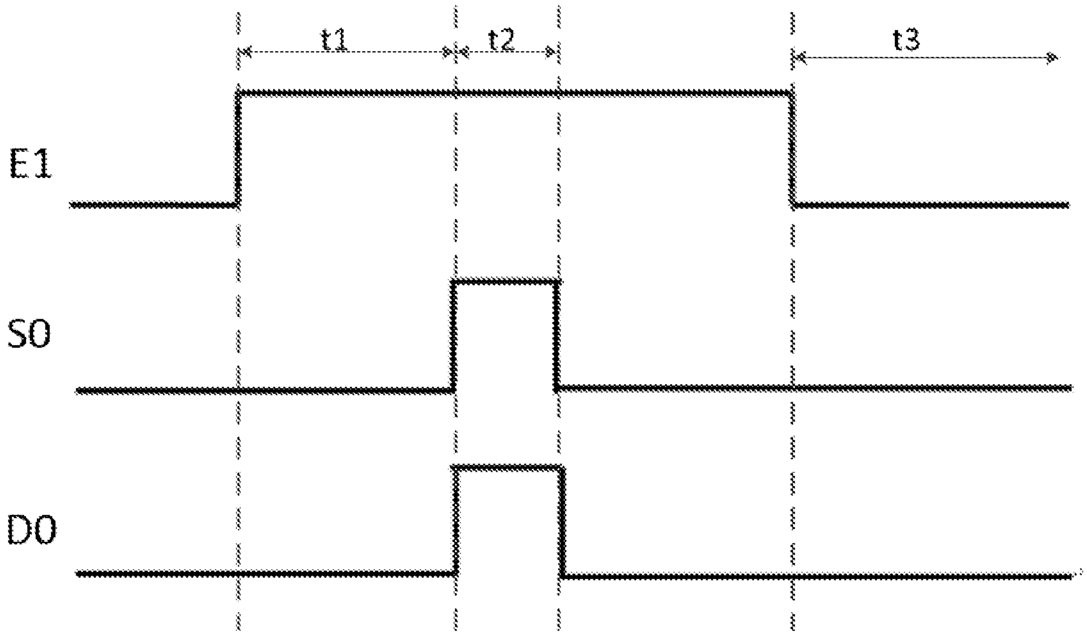
FIG. 8 is an timing diagram of the pixel circuit shown in FIG. 7 according to at least one embodiment of the present disclosure.

As shown in FIG. 8, when the pixel circuit shown in FIG. 7 of the present disclosure is in operation, the display period may include a reset phase t1, a data writing-in phase t2 and a light-emitting phase t3 that are set in sequence, Before the reset phase t1 begins, E1 provides a low voltage signal, and T6 is turned on, so that the potential of N3 is VD;

In the reset phase t1, E1 provides a high voltage signal, and T6 is turned off; S0 provides a low voltage signal, and T1 and T2 are turned on to write the low voltage signal provided by VSS into N4, and write the reference voltage Vr provided by R0 into N5, so the voltage value VS of the low voltage signal is less than the voltage value of Vr, so that the reverse charging is achieved;

In the data writing-in phase t2, both E1 and S0 provide high voltage signals, D0 provides the data voltage Vd, T5 is turned on to write Vd to N2, T7, T1 and T2 are all turned on to write Vr to N1 and N5, and the low voltage signal provided by VSS is written into N4, the voltage value VS of the low voltage signal is less than the voltage value of Vr, and the process of reverse charging is realized;

In the data writing-in phase t2, N1 is connected to Vr, T0 is turned on, T1 is turned on, and the voltage of N3 is gradually reduced by discharging to VSS until the potential of N3 becomes Vr−Vth, and T0 is turned off to complete the threshold voltage compensation;

In the light-emitting phase t3, E1 provides a low voltage signal, S0 provides a low voltage signal, T4 is turned on, T6, T0 and T3 are turned on, and T0 drives O1 to emit light;

In the light-emitting phase t3, the potential of N3 is restored from Vr−Vth to VD. Due to the bootstrap effect of the storage capacitor C1, the potential of N2 becomes Vd−Vr+Vth+VD. Since T4 is turned on, the potential of N1 is also Vd−Vr+Vth+VD;

In the light-emitting phase t3, the calculation formula of the current value I of the driving circuit where T0 drives O1 to emit light is as follows:

$$I=K(V_{N1}-V_{N3}-Vth)^2=K(Vd-Vr+Vth+VD-VD-Vth)^2=K(Vd-Vr)^2;$$

$V_{N1}$ is the potential of N1 in the light-emitting phase t3, $V_{N2}$ is the potential of N2 in the light-emitting phase t3, and K is the current coefficient of T0;

$$K=\frac{1}{2}\mu C_{ox}\frac{W}{L};$$

μ is the mobility of hole carriers, Cox is the capacitance per unit area of the gate insulating layer, and W/L is the width to length ratio of T0.

It can be seen from the above formula that I is only related to Vd and Vr, and is not related to VD and Vth.

When at least one embodiment of the pixel circuit shown in FIG. 7 of the present disclosure is in operation, in an interval phase between the data writing-in phase t2 and the light-emitting phase t3, E1 provides a high voltage signal, S0 provides a low voltage signal, and T1 and T2 are turned on to write Vr into N5, and write a low voltage signal provided by VSS into N4, the voltage value VS of the low voltage signal is less than the voltage value of Vr, and the process of reverse charging is realized.

Figure 9:
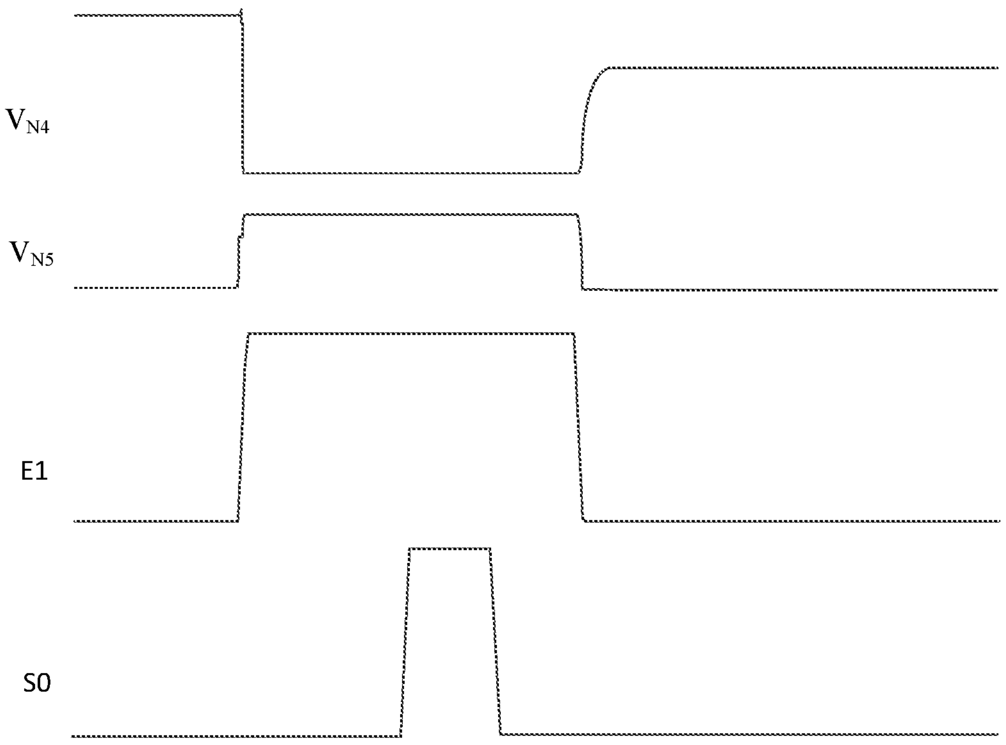
FIG. 9 is a simulation timing diagram of the pixel circuit shown in FIG. 7 according to at least one embodiment of the present disclosure.

As shown in FIG. 9, the potential $V_{N4}$ of N4 and the potential $V_{N5}$ of N6 obtained by simulating the pixel circuit shown in FIG. 7 show that when the potential of the first light-emitting control signal provided by E1 is a high voltage, the anode voltage of O1 is less than the cathode voltage of O1, and the reverse voltage of O1 is applied for a longer time, which is more conducive to improving the service life of O1.

The driving method described in at least one embodiment of the present disclosure is applied to the above-mentioned pixel circuit, and the display period includes a data writing-in phase and a light-emitting phase that are set successively, and the driving method includes:

In the data writing-in phase, writing, by the data writing-in circuit, the data voltage into the first end of the energy storage circuit under the control of the scan signal, and writing, by the second control circuit, a reference voltage provided by the reference voltage line to the second end of the light-emitting element under the control of the second control signal; writing, by the first control circuit, the first voltage signal provided by the first voltage line into the first end of the light-emitting element under the control of the first control signal;

In the light-emitting phase, controlling, by the third control circuit, to connect the first end of the energy storage circuit and the control end of the driving circuit under the control of the third control signal, and controlling, by the first light-emitting control circuit, to connect the second end of the light-emitting element and the second voltage line under the control of the first light-emitting control signal, and driving, by the driving circuit, the light-emitting element to emit light under the control of the potential of the control end thereof.

In the driving method described in at least one embodiment of the present disclosure, in the data writing-in phase, the first control circuit writes the first voltage signal provided by the first voltage line into the first end of the light-emitting element under the control of the first control signal, the second control circuit controls to write a reference voltage provided by the reference voltage line into the second end of the light-emitting element under the control of the second control signal, the first end of the light-emitting element can be an anode, and the second end of the light-emitting element can be a cathode, and the voltage value of the first voltage signal is set to a voltage value lower than the reference voltage, the reverse voltage is applied to the light-emitting element to realize the process of reverse charging, which is beneficial to prolong the service life of the light-emitting element.

In at least one embodiment of the present disclosure, the pixel circuit further includes a second light-emitting control circuit and an initial control circuit; the display period further includes a reset phase arranged before the data writing-in phase; the driving method further includes:

In the reset phase, controlling, by the second light-emitting control circuit, to connect the second voltage line and the first end of the driving circuit under the control of the second light-emitting control signal;

In the data writing-in phase, controlling, by the initial control circuit, to write the reference voltage into the control end of the driving circuit under the control of the initial control signal, so that when the data writing-in phase starts, the driving circuit can connect the first end of the driving circuit and the second end of the driving circuit under the control of the potential of the control end of the driving circuit, to change the potential of the first end of the driving circuit until the driving circuit is turned off to complete the threshold voltage compensation;

In the light-emitting phase, controlling, by the second light-emitting control circuit, to connect the second voltage line and the first end of the driving circuit under the control of the second light-emitting control signal.

In the driving method described in at least one embodiment of the present disclosure, in the data writing-in phase, the first control circuit writes the first voltage signal provided by the first voltage line into the first end of the light-emitting element under the control of the first control signal, the second control circuit controls to write the reference voltage provided by the reference voltage line into the second end of the light-emitting element under the control of the second control signal, the first end of the light-emitting element can be an anode, and the second end of the light-emitting element can be a cathode, and the voltage value of the first voltage signal is set to a voltage value lower than the reference voltage, the reverse voltage is applied to the light-emitting element to realize the process of reverse charging, which is beneficial to prolong the service life of the light-emitting element.

The driving method described in at least one embodiment of the present disclosure is applied to the above-mentioned pixel circuit, and the display period includes a reset phase, a data writing-in phase, and a light-emitting phase that are set successively, and the driving method includes:

In the reset phase and the data writing-in phase, controlling, by the first control circuit, to write the first voltage signal into the first end of the light-emitting element under the control of the first control signal, and controlling, by the second control circuit, to write the reference voltage to the second end of the light-emitting element under the control of the second control signal;

In the data writing-in phase, writing, by the data writing-in circuit, the data voltage into the first end of the energy storage circuit under the control of the scan signal;

In the light-emitting phase, controlling, by the third control circuit, to connect the first end of the energy storage circuit and the control end of the driving circuit under the control of the third control signal; controlling, by the first light-emitting control circuit, to connect the second end of the light-emitting element and the first voltage line under the control of the first light-emitting control signal, driving, by the driving circuit, the light-emitting element to emit light.

In the driving method described in at least one embodiment of the present disclosure, in the reset phase and the data writing-in phase, the first control circuit writes the first voltage signal provided by the first voltage line into the first end of the light-emitting element under the control of the first control signal, the second control circuit controls to write the reference voltage provided by the reference voltage line into the second end of the light-emitting element under the control of the second control signal, the first end of the light-emitting element can be an anode, the second end of the light-emitting element can be a cathode. By setting the voltage value of the first voltage signal to a voltage value lower than the reference voltage, the reverse voltage is applied to the light-emitting element, to realize the process of reverse charging, which is beneficial to improve the service life of the light-emitting element.

In at least one embodiment of the present disclosure, the pixel circuit further includes a second light-emitting control circuit and an initial control circuit; the driving method further includes:

In the data writing-in phase, writing, by the initial control circuit, a reference voltage into the control end of the driving circuit under the control of the initial control signal, so that when the data writing-in phase starts, the driving circuit can controls to connect the first end of the driving circuit and the second end of the driving circuit under the control of the potential of the control end of the driving circuit, to change the potential of the first end of the driving circuit until the driving circuit is turned off to complete the threshold voltage compensation;

In the light-emitting phase, controlling, by the second light-emitting control circuit, to connect the second voltage line and the first end of the driving circuit under the control of the second light-emitting control signal.

The display substrate according to the embodiment of the present disclosure includes the above-mentioned pixel circuit.

Figure 10:
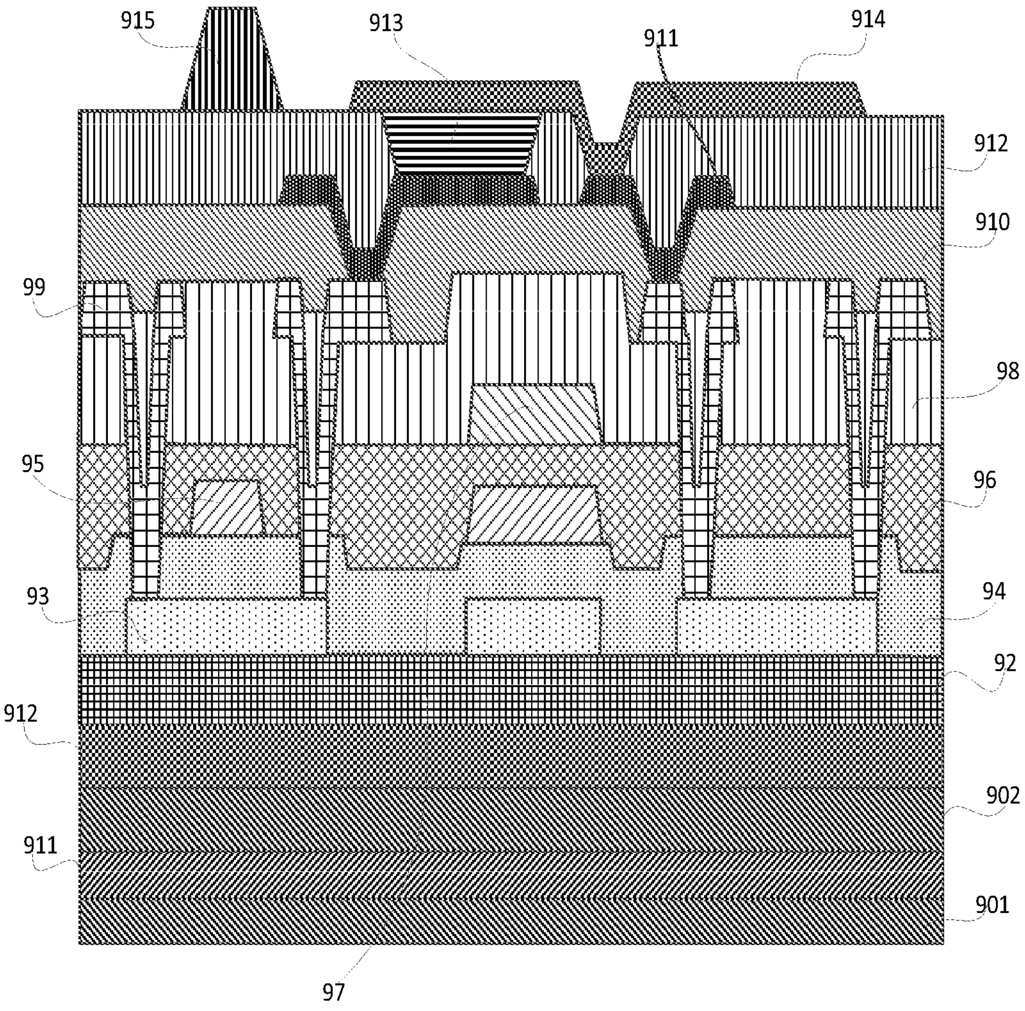
FIG. 10 is a schematic diagram of the stacking of film layers of the display substrate according to at least one embodiment of the present disclosure.

FIG. 10 is a schematic diagram of stacking of film layers the display substrate according to at least one embodiment of the present disclosure. At least one embodiment of the present disclosure adopts the existing stacked structure and technical process, and the cost is unchanged.

As shown in FIG. 10, the display substrate according to at least one embodiment of the present disclosure includes a first substrate 901, a first insulating layer 911, a second substrate 902, a second insulating layer 912, a buffer layer 92, a first semiconductor layer 93, a first gate insulating layer 94, a first gate metal layer 95, a second gate insulating layer 96, a second gate metal layer 97, an interlayer dielectric layer 98, a source-drain metal layer 99, a planarization layer 910, an anode layer 911, a pixel definition layer 912, a light-emitting material layer 913 and a cathode layer 914;

In FIG. 10, 915 is a spacing column.

As shown in FIG. 10, the current in the source-drain metal layer 99 can be left to the anode layer and then applied to the anode of the light-emitting element, and the current in the source-drain metal layer 99 can also flow into the anode layer, and then flow into the cathode of the light-emitting element, Thus, a TFT can simultaneously control the anode voltage of the light-emitting element and the cathode voltage of the light-emitting element.

In at least one embodiment of the display substrate shown in FIG. 10, the first substrate 901 and the second substrate 902 may be a flexible polyimide (PI) film;

The first insulating layer 911 and the second insulating layer 912 may be inorganic layers, for example, the first insulating layer 911 and the second insulating layer 912 may be made of SiOx;

The first semiconductor layer 93 may be made of P-Si (polysilicon);

The first gate insulating layer 94 and the second gate insulating layer 96 may be inorganic layers, for example, the first gate insulating layer 94 and the second gate insulating layer 96 may be made of SiO2;

The first gate metal layer 95 and the second gate metal layer 97 may be made of Mo;

The interlayer dielectric layer 98 can be an inorganic layer, for example, the interlayer dielectric layer 98 can be made of SiO2 or SiOx;

The plarization layer 910 may be an organic layer, for example, the organic layer may be a PI layer.

In at least one embodiment of the display substrate shown in FIG. 10, the low voltage line can be formed on the source-drain metal layer 99, but not limited thereto.

In at least one embodiment of the present disclosure, the inorganic layer may be one or more stacked layers of silicon nitride, silicon oxide, and silicon oxynitride, but not limited thereto.

The display device according to the embodiment of the present disclosure includes the above-mentioned display substrate.

The display device provided by the embodiment of the present disclosure may be any product or component with a display function, such as a mobile phone, a tablet computer, a television, a monitor, a notebook computer, a digital photo frame, and a navigator.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A pixel circuit, comprising a driving circuit, a light-emitting element, a first light-emitting control circuit, a first control circuit, a second control circuit, a third control circuit, a data writing-in circuit and an energy storage circuit, wherein the first control circuit is electrically connected to a first control line, a first voltage line and a second end of the driving circuit, respectively, and is configured to control to connect the first voltage line and a first end of the light-emitting element under the control of a first control signal provided by the first control line;

the first light-emitting control circuit is respectively electrically connected to a first light-emitting control line, a second end of the light-emitting element and the first voltage line, and is configured to control to connect the second end of the light-emitting element and the first voltage line under the control of a first light-emitting control signal provided by the first light-emitting control line;

the second control circuit is electrically connected to a second control line, a reference voltage line and the second end of the light-emitting element, respectively, is configured to control to connect the reference voltage line and the second end of the light-emitting element under the control of a second control signal provided by the second control line;

the third control circuit is electrically connected to a third control line, a first end of the energy storage circuit and a control end of the driving circuit, respectively, and is configured to control to connect the first end of the energy storage circuit and the control end of the driving circuit under the control of a third control signal provided by the third control line;

the data writing-in circuit is electrically connected to a scan line, a data line and the first end of the energy storage circuit, respectively, and is configured to control to write a data voltage on the data line into the first end of the energy storage circuit under the control of a scan signal provided by the scan line;

a second end of the energy storage circuit is electrically connected to a first end of the driving circuit, and the energy storage circuit is used for storing electrical energy;

the second end of the driving circuit is electrically connected to the first end of the light-emitting element; the driving circuit is configured to control to connect the first end of the driving circuit and the second end of the driving circuit under the control of a potential of the control end of the driving circuit;

the pixel circuit further comprises: a second light-emitting control circuit and an initial control circuit; wherein the second light-emitting control circuit is respectively electrically connected to a second light-emitting control line, a second voltage line and the first end of the driving circuit, and is configured to control to connect the first end of the driving circuit and the second voltage line under the control of a second light-emitting control signal provided by the second light-emitting control line;

the initial control circuit is respectively electrically connected to an initial control line, and the control end of the driving circuit and the reference voltage line, is configured to connect the reference voltage line and the control end of the driving circuit under the control of an initial control signal provided by the initial control line;

wherein the scan line and the initial control line are the same signal line.

2. The pixel circuit according to claim 1, wherein transistors included in the pixel circuit are all p-type transistors, and the third control line and the first light-emitting control line are a same signal line; the first control line, the second control line, the scan line, and the initial control line are a same signal line.

3. The pixel circuit according to claim 2, wherein the second light-emitting control circuit includes a sixth transistor, and the initial control circuit includes a seventh transistor;

a control electrode of the sixth transistor is electrically connected to the second light-emitting control line, a first electrode of the sixth transistor is electrically connected to the second voltage line, and a second electrode of the sixth transistor is electrically connected to the first electrode of the driving transistor;

a control electrode of the seventh transistor is electrically connected to the initial control line, a first electrode of the seventh transistor is electrically connected to the reference voltage line, and a second electrode of the seventh transistor is electrically connected to the control end of the driving circuit.

4. The pixel circuit according to claim 2, wherein the first control circuit includes a first transistor, the second control circuit includes a second transistor, and the first light-emitting control circuit includes a third transistor;

a control electrode of the first transistor is electrically connected to the first control line, a first electrode of the first transistor is electrically connected to the first voltage line, and a second electrode of the first transistor is electrically connected to the second end of the driving circuit;

a control electrode of the second transistor is electrically connected to the second control line, a first electrode of the second transistor is electrically connected to the reference voltage line, and a second electrode of the second transistor is electrically connected to the second end of the light-emitting element;

a control electrode of the third transistor is electrically connected to the first light-emitting control line, a first electrode of the third transistor is electrically connected to the first voltage line, and a second electrode of the third transistor is electrically connected to the second end of the light-emitting element.

5. The pixel circuit according to claim 2, wherein the third control circuit includes a fourth transistor, the data writing-in circuit includes a fifth transistor, and the energy storage circuit includes a storage capacitor;

a control electrode of the fourth transistor is electrically connected to the third control line, a first electrode of the fourth transistor is electrically connected to a first end of the storage capacitor, and a second electrode of the fourth transistor is electrically connected to the control end of the driving circuit;

a control electrode of the fifth transistor is electrically connected to the scan line, a first electrode of the fifth transistor is electrically connected to the data line, and a second electrode of the fifth transistor is electrically connected to the first end of the storage capacitor;

a second end of the storage capacitor is electrically connected to the first end of the driving circuit.

6. The pixel circuit according to claim 1, wherein transistors included in the first light-emitting control circuit and transistors included in the second light-emitting control circuit are p-type transistors; transistors included in the third control circuit are p-type transistors, the transistors included in the second control circuit are n-type transistors; the first light-emitting control line, the second light-emitting control line, the second control line and the third control line are a same signal line;

transistors included in the data writing-in circuit are n-type transistors, transistors included in the initial control circuit are n-type transistors, and the scan line and the initial control line are a same signal line.

7. The pixel circuit according to claim 1, wherein the first control circuit includes a first transistor, the second control circuit includes a second transistor, and the first light-emitting control circuit includes a third transistor;

a control electrode of the first transistor is electrically connected to the first control line, a first electrode of the first transistor is electrically connected to the first voltage line, and a second electrode of the first transistor is electrically connected to the second end of the driving circuit;

a control electrode of the second transistor is electrically connected to the second control line, a first electrode of the second transistor is electrically connected to the reference voltage line, and a second electrode of the second transistor is electrically connected to the second end of the light-emitting element;

a control electrode of the third transistor is electrically connected to the first light-emitting control line, a first electrode of the third transistor is electrically connected to the first voltage line, and a second electrode of the third transistor is electrically connected to the second end of the light-emitting element.

8. The pixel circuit according to claim 1, wherein the third control circuit includes a fourth transistor, the data writing-in circuit includes a fifth transistor, and the energy storage circuit includes a storage capacitor;

a control electrode of the fourth transistor is electrically connected to the third control line, a first electrode of the fourth transistor is electrically connected to a first end of the storage capacitor, and a second electrode of the fourth transistor is electrically connected to the control end of the driving circuit;

a control electrode of the fifth transistor is electrically connected to the scan line, a first electrode of the fifth transistor is electrically connected to the data line, and a second electrode of the fifth transistor is electrically connected to the first end of the storage capacitor;

a second end of the storage capacitor is electrically connected to the first end of the driving circuit.

9. The pixel circuit according to claim 1, wherein the second light-emitting control circuit includes a sixth transistor, and the initial control circuit includes a seventh transistor;

a control electrode of the sixth transistor is electrically connected to the second light-emitting control line, a first electrode of the sixth transistor is electrically connected to the second voltage line, and a second electrode of the sixth transistor is electrically connected to the first electrode of the driving transistor;

a control electrode of the seventh transistor is electrically connected to the initial control line, a first electrode of the seventh transistor is electrically connected to the reference voltage line, and a second electrode of the seventh transistor is electrically connected to the control end of the driving circuit.

10. The pixel circuit according to claim 1, wherein the driving circuit comprises a driving transistor;

a control electrode of the driving transistor is the control end of the driving circuit, a first electrode of the driving transistor is the first end of the driving circuit, and a second electrode of the driving circuit is the second end of the driving circuit.

11. A driving method, applied to the pixel circuit according to claim 1, wherein a display period includes a data writing-in phase and a light-emitting phase that are set successively, the driving method comprising:

in the data writing-in phase, writing, by the data writing-in circuit, the data voltage into the first end of the energy storage circuit under the control of the scan signal, and writing, by the second control circuit, the reference voltage provided by the reference voltage line to the second end of the light-emitting element under the control of the second control signal; writing, by the first control circuit, the first voltage signal provided by the first voltage line into the first end of the light-emitting element under the control of the first control signal;

in the light-emitting phase, controlling, by the third control circuit, to connect the first end of the energy storage circuit and the control end of the driving circuit under the control of the third control signal, and controlling, by the first light-emitting control circuit, to connect the second end of the light-emitting element and the first voltage line under the control of the first light-emitting control signal, and driving, by the driving circuit, the light-emitting element to emit light under the control of the potential of the control end of the driving circuit;

wherein the display period further comprises a reset phase arranged before the data writing-in phase; the driving method further includes:

in the reset phase, controlling, by the second light-emitting control circuit, to connect the second voltage line and the first end of the driving circuit under the control of the second light-emitting control signal;

in the data writing-in phase, controlling, by the initial control circuit, to write the reference voltage into the control end of the driving circuit under the control of the initial control signal, so that when the data writing-in phase starts, the driving circuit controls to connect the first end of the driving circuit and the second end of the driving circuit under the control of the potential of the control end of the driving circuit, to change the potential of the first end of the driving circuit until the driving circuit is turned off, in the light-emitting phase, controlling, by the second light-emitting control circuit, to connect the second voltage line and the first end of the driving circuit under the control of the second light-emitting control signal.

12. A driving method, applied to the pixel circuit according to claim 1, wherein a display period includes a reset phase, a data writing-in phase and a light-emitting phase that are set successively, the driving method comprising:

in the reset phase and the data writing-in phase, controlling, by the first control circuit, to write the first voltage signal into the first end of the light-emitting element under the control of the first control signal, and controlling, by the second control circuit, to write the reference voltage to the second end of the light-emitting element under the control of the second control signal;

in the data writing-in phase, writing, by the data writing-in circuit, the data voltage into the first end of the energy storage circuit under the control of the scan signal;

in the light-emitting phase, controlling, by the third control circuit, to connect the first end of the energy storage circuit and the control end of the driving circuit under the control of the third control signal; controlling, by the first light-emitting control circuit, to connect the second end of the light-emitting element and the first voltage line under the control of the first light-emitting control signal, driving, by the driving circuit, the light-emitting element to emit light;

wherein the driving method further comprises:

in the data writing-in phase, writing, by the initial control circuit, the reference voltage into the control end of the driving circuit under the control of the initial control signal, so that when the data writing-in phase starts, the driving circuit controls to connect the first end of the driving circuit and the second end of the driving circuit under the control of the potential of the control end of the driving circuit, to change the potential of the first end of the driving circuit until the driving circuit is turned off, in the light-emitting phase, controlling, by the second light-emitting control circuit, to connect the second voltage line and the first end of the driving circuit under the control of the second light-emitting control signal.

13. A display substrate comprising the pixel circuit according to claim 1.

14. A display device comprising the display substrate according to claim 13.

* * * * *